United States Patent Office 2,910,488
Patented Oct. 27, 1959

2,910,488
ANILINE DERIVATIVES
Frederick C. Novello, Lansdale, Pa., assignor to Merck & Co., Inc., Rahway, N.J., a corporation of New Jersey
No Drawing. Application January 22, 1958
Serial No. 710,385
7 Claims. (Cl. 260—397.7)

This invention is concerned with novel anthranilic acid compounds containing a sulfamyl substituent attached to one of the nuclear carbons, and with methods for preparing the compounds. The compounds of this invention are illustrated by the following structure

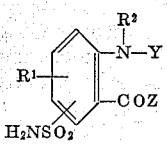

and includes the alkali metal and alkaline earth metal salts thereof wherein $R^1$ is a halogen, such as chlorine, bromine, fluorine and the like, a lower alkyl radical advantageously having from 1 to 5 carbon atoms, a lower alkoxy radical also advantageously having from 1 to 5 carbon atoms in the alkyl portion of the radical or a nitro or an amino group; $R^2$ is hydrogen or a lower alkyl radical having advantageously from 1 to 5 carbon atoms; Y is hydrogen, a lower alkyl radical having from 1 to 5 carbon atoms, a lower alkanoyl having from 1 to 12 carbon atoms, or a mononuclear aroyl radical such as a benzoyl radical; and Z represents hydroxy, a lower alkoxy group having advantageously from 1 to 5 carbon atoms, the amino group, a mono- or di-alkylamino group each alkyl substituent preferably having from 1 to 3 carbon atoms, or a piperidyl, pyrrolidyl, or a morpholinyl radical The novel compounds of the invention are useful pharmacotherapeutic agents particularly because of their diuretic, natriuretic, and/or saluretic properties (hereinafter referred to as diuretic properties). They can be administered in therapeutic dosages in conventional vehicles as in the form of tablets, pills, capsules, and the like as these compounds are effective upon oral administration. As the compounds of this invention also are soluble in a dilute alkaline medium or in polyethylene glycol, injectable solutions can be prepared for parenteral administration by dissolving the compound in the selected medium to which preservatives can be added if desired.

Dosages between about 5 to about 10 mg./kg./day generally are suitable to produce a diuretic response. Of course, more or less of the active ingredient can be employed depending upon the age and condition of the individual who is to receive the compound and for this reason scored tablets comprising 0.5 g. of active ingredient or more can be supplied to the physician for the symptomatic adjustment of dosage to the individual patient. These recommended dosages appear to be well below the toxic dose of the compounds as evidenced by the fact the acute intravenous $LD_{50}$ in mice of each of the components 2-carboxy-5-chloro-4-sulfamylacetanilide and 2-carboxy-5-chloro-4-sulfamylaniline is greater than 600 mg./kg. and no toxic reactions were observed when either of these compounds was administered to dogs, intravenously, at dosages up to 15 mg./kg.

The diuretic properties of the novel compounds of this invention make them particularly useful in the treatment of congestive heart failure and other pathological conditions which produce an edematous condition in the body, or which produce an imbalance in the electrolyte concentration in the body as, for example, those in which an abnormal retention of sodium occurs.

The novel sulfamyl-anthranilic acids of this invention also are useful as intermediates in preparing 4-quinazolone derivatives which also possess diuretic, natriuretic and/or saluretic properties. The conversion of the sulfamyl-anthranilic acids to the 4-quinazolones is described in detail in my United States patent application filed concurrently, and having the Serial No. 710,386. In general, the sulfamyl-anthranilic acids of this invention are heated with formamide or ethyl orthoformate to form the corresponding 4-quinazolone. The sulfamyl-anthranilic acids wherein the carboxyl group has been converted to a carbamyl and an acyl group is attached to the amino nitrogen can be cyclized to a 4-quinazolone by heating.

The novel anthranilic acids of this invention can be prepared by one or more of the methods illustrated below.

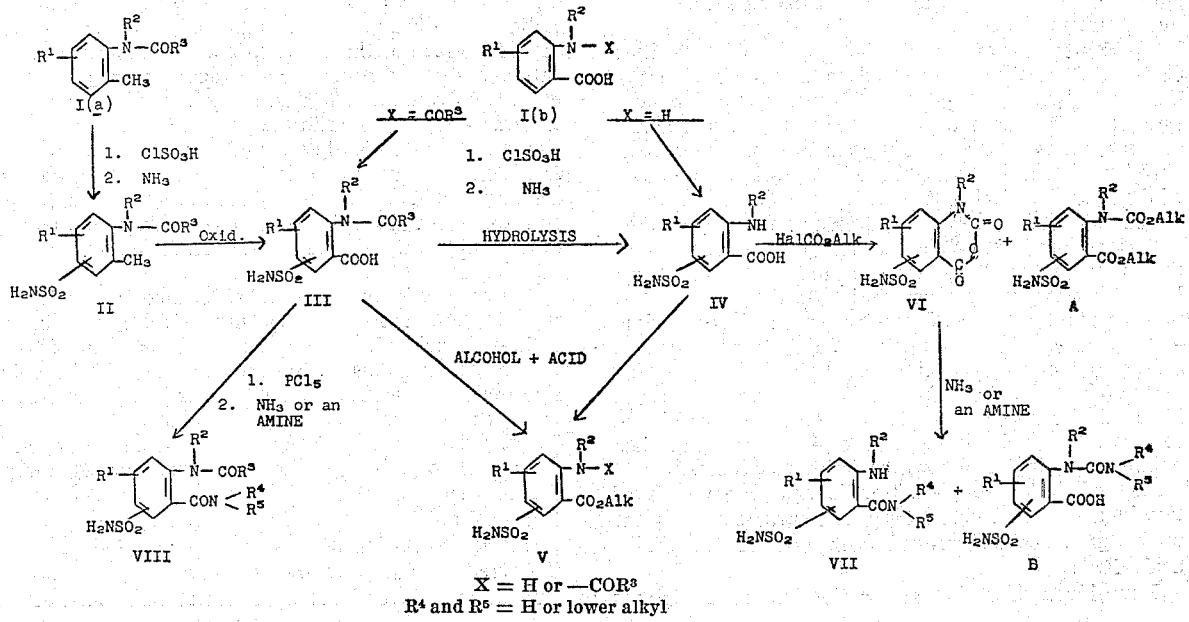

$X = H$ or $—COR^3$
$R^4$ and $R^5 = H$ or lower alkyl

The sulfamyl-anthranilic acid compound, III, can be prepared either from a 2-methylacylanilide I(a) or from the anthranilic acid, I(b), wherein one or the other of these starting materials is a known compound. Either of these routes of synthesis can be employed in substantially every case although when R¹ is a methyl radical it is preferred to employ starting material I(b) in order to avoid oxidizing the methyl radical when converting Compound II to Compound III.

As can be seen from the above reaction schemes, the preparation of the sulfamyl-anthranilic compound illustrated by the generic structure wherein Y is hydrogen, is best accomplished by hydrolyzing Compound III to remove the N-acyl group thus forming Compound IV. The amides of Compound IV then can be made by initially preparing the sulfamyl-isatoic anhydride, VI, by heating the sulfamyl-anthranilic acid IV with the appropriate alkyl halocarbonate. The amide then is prepared from the sulfamyl-isatoic anhydride, VI, by reaction with ammonia or an amine.

However, when it is desired that Y in the generic structure of the compounds be an acyl substituent then the N-acyl Compound III can be converted to the acid chloride and subsequently treated with ammonia or an amine to form the amide.

When R² and Y in the generic structure each are to be an alkyl radical, these compounds are prepared by alkylation of the appropriate 2-methyl- or 2-carboxy-N-alkylaniline compound and substituting these dialkylanilines for Compounds I(a) or I(b) in the reactions described herein.

The conversion of the 2-methylaniline, Compound I(a), to the 2-methylsulfamylaniline, Compound II, is accomplished by first chlorosulfonating Compound I(a) with chlorosulfonic acid advantageously employing an excess of a molar equivalent of chlorosulfonic acid and preferably heating the reaction mixture at between about 60–100° C.

The sulfonyl chloride derivative of I(a) then is treated with ammonia, preferably between about 0° C. to room temperature, and then heating the reaction mixture advantageously on the steam bath thus forming the 2-methyl-4-sulfamylaniline, Compound II.

The ammonia used in the amidation step is employed in excess of that required to convert the sulfonyl chloride group to the sulfamyl group and preferably at least two molar equivalents of ammonia is used. Ammonia can be added in the form of aqueous or alcoholic ammonium hydroxide, liquid ammonia, or by dissolving the sulfonyl chloride in an organic solvent and bubbling ammonia gas into the solution to form the sulfamyl derivative.

The 2-methyl group of the 2-methyl-4-sulfamylaniline Compound II, then is oxidized to the carboxyl group preferably by heating at about 100° C. a reaction mixture containing Compound II, potassium permanganate and magnesium sulfate. The reaction mixture preferably is maintained at a neutral pH to avoid the removal of the N-acyl radical, and the reaction is continued until the characteristic color of the permanganate disappears.

As mentioned above, the reactions described above for the conversion of Compound I(a) to Compound III can be employed with any of the intermediates needed to prepare the sulfamyl-anthranilic acids of this invention; although when R¹ represents a methyl radical it is preferable to employ a starting material of the type represented by structure I(b). In those instances where the N-acyl derivative of either Compound I(a) or I(b) is not readily available, it can be prepared from the appropriate aniline compound by known acylation procedures.

Any of the sulfamyl-anthranilic acid compounds of this invention, and particularly those wherein R¹ is the methyl group, can be prepared from the N-acylanthranilic acids I(b).

The chlorosulfonation and amidation of Compound I(b) to form Compounds III or IV is carried out in substantially the same manner described above for the conversion of the 2-methyl-aniline compound, I(a), to the 2-methylsulfamylaniline Compound II.

Compound III then can be hydrolyzed to the sulfamyl-anthranilic acid, Compound IV, by any of the usual methods such as by heating on the steam bath in the presence of hydrochloric acid or refluxing a mixture of Compound III, alcohol and concentrated hydrochloric acid.

The amides of the sulfamyl-anthranilic acids wherein in the generic structure R² is hydrogen or a lower alkyl and Z is hydrogen can be prepared from Compound IV.

The amide derivatives of Compound IV are prepared by heating the 2-carboxy-sulfamylaniline, Compound IV, with an alkyl halocarbonate to form the sulfamyl-isatoic anhydride, VI, and (2-carbalkoxy-sulfamylphenyl)alkylcarbamate, A. Compounds VI and A can be separated by taking advantage of their different solubilities in dioxane. The sulfamyl-isatoic anhydride, VI, which is insoluble in dioxane, then is separated and reacted with ammonia or an amine to form a mixture of 2-carbamyl-sulfamyl-aniline, VII, and (2-carboxy-sulfamylphenyl)-urea, B, which can be separated by virtue of their solubility coefficients in aqueous ammonia; the insoluble Compound VII then can be recovered by any of the well-known procedures, as by filtration and the like. Amidation of Compound VI advantageously is effected by stirring or shaking a mixture of Compound VI with ammonium hydroxide or other forms of ammonia, as aqueous or alcoholic ammonia, liquid ammonia, or ammonia gas or with the selected amine at room temperature or at slightly elevated temperature for from 5–8 hours and then removing the excess ammonia or amine in vacuo. At least two equivalents of ammonia or the selected amine can be used although in practice an excess generally is employed as the excess will not interfere with the reaction and the cost is not significant.

The carboxamides of Compound III, that is the 2-carboxy-sulfamylacylanilides, and the carboxamides of 2-carboxy-sulfamyl-N-alkylaniline and of 2-carboxy-sulfamyl-N,N-dialkylaniline are prepared using the appropriately substituted sulfamyl-anthranilic acid and converting it to the acid chloride with a chlorinating agent selected from phosphorus pentachloride, phosphorus trichloride, thionyl chloride, sulfuryl chloride, and the like, advantageously at room temperature or at slightly elevated temperatures. The reaction carries through in the presence of a solvent such as benzene, toluene, dioxane and the like, and the anthranilic acid chloride thus obtained then is treated with ammonia or an amine to form the carbamyl derivative, VIII. Ammonia in substantially any form, such as those recited above, can be employed either with or without a solvent and advantageously at room temperature. When an amine is used, the reaction preferably is conducted in the presence of a solvent and either at room or slightly elevated temperatures. Whether ammonia or an amine is used to form the carbamyl derivative VIII, at least two equivalents are used although an excess can and usually is employed without interferring in any way with the successful amidation of the anthranilic acid chloride.

The esters of Compound III or Compound IV advantageously are prepared by reacting the selected sulfamyl-anthranilic acid, III or IV, with an alcohol having from 1 to 5 carbon atoms, in the presence of hydrogen chloride thus forming Compound V wherein X is hydrogen or an acyl radical.

The alkali metal salts of the sulfamyl-anthranilic acid compounds of this invention can be prepared by any of the conventional methods such as by dissolving the selected sulfamyl-anthranilic acid compound in an aqueous or alcoholic solution of the alkali metal hydroxide, and, if desired, isolating the salt by evaporating the solvent. Any of the conventional alkali metal salts, such as the sodium, potassium, lithium, or the like salts, can be prepared by this method or by other methods known to organic chemists. The alkaline earth metal salts are prepared by replacement of the alkali metal by an alkaline earth metal by well known procedures.

While the above discussion outlines general methods suitable for the preparation of the sulfamyl-anthranilic acid compounds of this invention, other methods can, of course, be employed. Also, modifications can be made in the procedural steps described above to improve the conditions for the preparation of any particular compound it is desired to prepare. It is to be understood, therefore, that the following examples, which more fully describe the preparation of the compounds of this invention, are illustrative of the methods which can be employed for the preparation of the novel compounds of this invention and are not to be construed as limiting the invention to the particular methods or the particular compounds specifically described.

EXAMPLE 1

*2-carboxy-5-chloro-4-sulfamylacetanilide*

Step A.—A solution of 18 g. of 5-chloro-2-methylacetanilide in 50 ml. of chlorosulfonic acid is heated on the steam bath for 45 minutes, cooled, and poured onto ice. The solid is collected on a filter and transferred to a beaker. Ammonium hydroxide (50 ml.) is added and the mixture heated on the steam bath for 1 hour and then cooled in an ice bath. The solid is collected and recrystallized from a 50% alcohol-water mixture to give 5-chloro-2-methyl-4-sulfamylacetanilide, M.P. 262–263° C.

Analysis calculated for $C_9H_{11}ClN_2O_3S$: C, 41.14; H, 4.22; N, 10.66. Found: C, 41.16; H, 4.41; N, 10.66.

Step B.—A mixture of 31.5 g. of the thus obtained compound, 37.2 g. of magnesium sulfate, and 52.8 g. of potassium permanganate in 2,800 ml. of water is heated under reflux with stirring for 5 hours. Sodium carbonate (51 g.) is added portionwise with caution and the solution filtered through a layer of charcoal. The filtrate is cooled in an ice bath and acidified with hydrochloric acid. The precipitate is collected on the filter and recrystallized from alcohol-water yielding 2-carboxy-5-chloro-4-sulfamylacetanilide, M.P. 269–270° C. (dec.).

Analysis calculated for $C_9H_9ClN_2O_5S$: C, 36.93; H, 3.10; N, 9.57. Found: C, 37.17; H, 3.25; N, 9.56.

EXAMPLE 2

*2-carboxy-5-chloro-4-sulfamylaniline*

A suspension of 10 g. of 2-carboxy-5-chloro-4-sulfamylacetanilide, obtained as described in Example 1, in a mixture of 100 ml. of concentrated hydrochloric acid and 40 ml. of ethanol is heated under reflux for 10–15 minutes. The solution is diluted with water (50 ml.) and cooled in an ice bath. The crystalline precipitate is collected on the filter and recrystallized from alcohol-water yielding 2-carboxy-5-chloro-4-sulfamylaniline, M.P. 267° C. (dec.).

Analysis calculated for $C_7H_7ClN_2O_4S$: C, 33.54; H, 2.82; N, 11.18. Found: C, 33.89; H, 3.15; N, 11.15.

EXAMPLE 3

*2-N-ethylcarbamyl-5-chloro-4-sulfamylacetanilide*

A suspension of 30 g. of 2-carboxy-5-chloro-4-sulfamylacetanilide (prepared as described in Example 1, Steps A and B) and 21 g. of phosphorus pentachloride in 300 ml. of benzene is stirred at room temperature for 1–2 hours. The mixture is filtered and the precipitate washed with 100 ml. of hot benzene. To the combined benzene extracts, cooled in an ice bath, a solution of 25 g. of ethylamine in 100 ml. of anhydrous ether is added with stirring over 30 minutes. After one hour at room temperature the solvent is removed in vacuo and the residue washed with water and crystallized from aqueous alcohol to give 2-N-ethylcarbamyl-5-chloro-4-sulfamylacetanilide.

EXAMPLE 4

*2-carboxy-5-chloro-4-sulfamyl-N-methylaniline*

By replacing the 5-chloro-2-methylacetanilide employed in Example 1, Step A, by an equimolecular quantity of 2-carboxy-5-chloro-N-methylaniline and following substantially the same procedure described in Example 1, Step A, there is obtained 2-carboxy-5-chloro-4-sulfamyl-N-methylaniline.

EXAMPLE 5

*2-carboxy-5-methoxy-4-sulfamylaniline*

By replacing the 5-chloro-2-methylacetanilide employed in Example 1, Step A, by an equimolecular quantity of 2-carboxy-5-methoxyaniline and following substantially the same procedure described in Example 1, Step A, there is obtained 2-carboxy-5-methoxy-4-sulfamylaniline.

EXAMPLE 6

*2-carboxy-5-methoxy-4-sulfamyl-N-methylacetanilide*

Step A.—2 - carboxy - 5 - methoxy - N - methylaniline (1 mole) is added portionwise over a period of 10–15 minutes to acetic anhydride (1.5 moles) cooled in an ice bath. After standing at room temperature for 1–2 hours, the mixture is heated on the steam bath for 30 minutes and then cooled in an ice bath. Cold water (1 liter) is added and the product taken up in ether, washed with water, dried over sodium sulfate and evaporated to dryness on the steam bath yielding 2-carboxy-5-methoxy-N-methylacetanilide.

Step B.—By replacing the 5-chloro-2-methylacetanilide employed in Example 1, Step A, by an equimolecular quantity of the product obtained in Step A above, and following substantially the same procedure described in Example 1, Step A, there is obtained 2-carboxy-5-methoxy-4-sulfamyl-N-methylacetanilide.

EXAMPLE 7

*N-ethylcarbamyl-5-methoxy-4-sulfamyl-N-methylacetanilide*

By replacing the 2-carboxy-5-chloro-4-sulfamylacetanilide employed in Example 3, by an equimolecular quantity of the 2-carboxy-5-methoxy-4-sulfamyl-N-methylacetanilide obtained as described in Example 6 above, and following substantially the same procedure described in Example 3, there is obtained 2-N-ethylcarbamyl-5-methoxy-4-sulfamyl-N-methylacetanilide.

EXAMPLE 8

*2-carboxy-5-nitro-4-sulfamylaniline*

By replacing the 5-chloro-2-methylacetanilide employed in Example 1, Step A, by an equimolecular quantity of 2-carboxy-5-nitroaniline and following substantially the same procedure described in Example 1, Step A, there is obtained 2-carboxy-5-nitro-4-sulfamylaniline.

EXAMPLE 9

*2-carboxy-5-nitro-4-sulfamyl-N-methylacetanilide*

By replacing the 5-chloro-2-methylacetanilide employed in Example 1, Step A, by an equimolecular quantity of 2-methyl-5-nitro-N-methylacetanilide and following substantially the same procedures described in Example 1, Steps A and B, there is obtained 2-carboxy-5-nitro-4-sulfamyl-N-methylacetanilide.

EXAMPLE 10

*2-carboxy-5-nitro-4-sulfamyl-N-methylaniline*

The 2-carboxy-5-nitro-4-sulfamyl-N-methylacetanilide, prepared as described in Example 9, is hydrolyzed by substantially the same procedure described in Example 2 to form 2-carboxy-5-nitro-4-sulfamyl-N-methylaniline.

EXAMPLE 11

2-carboxy-5-methyl-4-sulfamylaniline

By replacing the 5-chloro-2-methylacetanilide employed in Example 1, Step A, by an equimolecular quantity of 2-carboxy-5-methylaniline and following substantially the same procedure described in Example 1, Step A, there is obtained 2-carboxy-5-methyl-4-sulfamylaniline.

EXAMPLE 12

2-carboxy-5-propyl-4-sulfamylacetanilide

Step A.—2-methyl-5-propylaniline (1 mole) is added portionwise over a period of 10–15 minutes to acetic anhydride (1.5 mole) cooled in an ice bath. After standing at room temperature for 1–2 hours, the mixture is heated on the steam bath for 30 minutes and then cooled in an ice bath. Cold water (1 liter) is added and the product taken up in ether, washed with water, dried over sodium sulfate and evaporated to dryness on the steam bath to give 2-methyl-5-propylacetanilide.

Step B.—By replacing the 5-chloro-2-methylacetanilide employed in Example 1, Step A, by an equimolecular quantity of the product obtained as described in Step A above, and following substantially the same procedures described in Steps A and B of Example 1, there is obtained 2-carboxy-5-propyl-4-sulfamylacetanilide.

EXAMPLE 13

2-carboxy-5-propyl-4-sulfamylaniline

The 2-carboxy-5-propyl-4-sulfamylacetanilide, prepared as described in Example 12, is hydrolyzed by substantially the same procedure described in Example 2 to form the corresponding 2-carboxy-5-propyl-4-sulfamylaniline.

EXAMPLE 14

2-carboxy-5-propoxy-4-sulfamylacetanilide

Step A.—To a solution of 165 g. of 2-methyl-5-hydroxyacetanilide in an ethanolic solution of sodium ethoxide prepared from 27.6 g. of sodium and 600 ml. of anhydrous ethanol, propylbromide (164 g.) is added dropwise over a 30 minute period. After standing at room temperature for 2 hours, the mixture is heated on the steam bath for 5 hours, cooled, filtered, and concentrated to dryness in vacuo. Crystallization of the product thus obtained from dilute alcohol gives 2-methyl-5-propoxyacetanilide.

Step B.—By replacing the 5-chloro-2-methylacetanilide employed in Example 1, Step A, by an equimolecular quantity of the thus obtained 2-methyl-5-propoxyacetanilide, and following substantially the same procedures described in Example 1, Steps A and B, there is obtained 2-carboxy-5-propoxy-4-sulfamylacetanilide.

EXAMPLE 15

2-carboxy-5-propoxy-4-sulfamylaniline

The 2-carboxy-5-propoxy-4-sulfamylacetanilide prepared as described in Example 14, is hydrolyzed by substantially the same procedure described in Example 2, to the corresponding 2-carboxy-5-propoxy-4-sulfamylaniline.

EXAMPLE 16

2-carboxy-5-chloro-4-sulfamyl-N-propylacetanilide

Step A.—To a mixture of 132 g. (1.0 mole) of 5-chloro-2-methylaniline and 1 liter of water containing 100 g. of sodium hydroxide cooled in an ice bath, benzenesulfonyl chloride (207 g.) is added with stirring over a 30 minute period. After stirring at room temperature for an additional 2 hours, the precipitate, consisting of the sodium salt of N-(2-methyl-5-chlorophenyl)-benzenesulfonamide, is collected and dissolved in 750 ml. of water. The mixture then is cooled in an ice bath, and propyl iodide (170 g.) is added dropwise over a 30 minute period. After stirring for 1 hour at room temperature, the mixture is extracted with ether, and the ethereal extract washed with water, dried over sodium sulfate, and evaporated to dryness on the steam bath. The residue thus obtained is dissolved in 150 ml. of acetic acid, heated under reflux with 350 ml. of concentrated hydrochloric acid for 6 hours, cooled, and after the solution is made basic with sodium hydroxide pellets, it is extracted with ether. The ethereal extract then is washed with water, dried over sodium sulfate, and distilled in vacuo to give 5-chloro-2-methyl-N-propylaniline.

Step B.—By replacing the 2-methyl-5-propylaniline employed in Example 12, Step A, by an equimolecular quantity of the thus obtained 5-chloro-2-methyl-N-propylaniline, and following substantially the same procedure described in Example 12, Step A, there is obtained 5-chloro-2-methyl-N-propylacetanilide.

Step C.—By replacing the 5-chloro-2-methylacetanilide employed in Example 1, Step A, by an equimolecular quantity of the 5-chloro-2-methyl-N-propylacetanilide obtained as described above, and following substantially the same procedures described in Example 1, Steps A and B, there is obtained 2-carboxy-5-chloro-4-sulfamyl-N-propylacetanilide.

EXAMPLE 17

2-carboxy-5-chloro-4-sulfamyl-N-propylaniline

The 2-carboxy-5-chloro-4-sulfamyl-N-propylacetanilide, obtained as described in Example 16, is hydrolyzed by substantially the same procedure described in Example 2, to form the corresponding 2-carboxy-5-chloro-4-sulfamyl-N-propylaniline.

EXAMPLE 18

2-carboxy-5-fluoro-4-sulfamylacetanilide

Step A.—By replacing the 2-methyl-5-propylaniline employed in Step A of Example 12, by an equimolecular quantity of 5-fluoro-2-methylaniline and following substantially the same procedure described in Example 12, Step A, there is obtained 5-fluoro-2-methylacetanilide.

Step B.—By replacing the 5-chloro-2-methylacetanilide employed in Example 1, Step A, by an equimolecular quantity of 5-fluoro-2-methylacetanilide obtained as described above, and following substantially the same procedures described in Example 1, Steps A and B, there is obtained 2-carboxy-5-fluoro-4-sulfamylacetanilide.

EXAMPLE 19

2-carboxy-5-fluoro-4-sulfamylaniline

The 2-carboxy-5-fluoro-4-sulfamylacetanilide, obtained as described in Example 18, is hydrolyzed by substantially the same procedure described in Example 2 to form the corresponding 2-carboxy-5-fluoro-4-sulfamylaniline.

EXAMPLE 20

2-carboxy-4-chloro-5-sulfamylacetanilide

Step A.—4-chloro-2-methylacetanilide-5-sulfonyl chloride (25 g.) is added in portions over five minutes to 100 ml. of 28% ammonium hydroxide cooled in an ice bath. After heating on the steam bath for 1 hour, the mixture is cooled, and the product collected and recrystallized from aqueous alcohol to give 4-chloro-2-methyl-5-sulfamylacetanilide.

Step B.—The product thus obtained is oxidized by substantially the same procedure described in Example 1, Step B, to form 2-carboxy-4-chloro-5-sulfamylacetanilide.

EXAMPLE 21

2-carboxy-4-chloro-5-sulfamylaniline

The 2-carboxy-4-chloro-5-sulfamylacetanilide, obtained as described in Example 20, is hydrolyzed by substantially the same procedure described in Example 2 to form the corresponding 2-carboxy-4-chloro-5-sulfamylaniline.

EXAMPLE 22

*2-carboxy-5-nitro-4-sulfamyl-N-ethylaniline*

By replacing the 5-chloro-2-methylacetanilide employed in Example 1, Step A, by an equimolecular quantity of 2-carboxy-5-nitro-N-ethylaniline and followingn substantially the same procedure described in Example 1, Step A, there is obtained 2-carboxy-5-nitro-4-sulfamyl-N-ethylaniline.

EXAMPLE 23

*2-carboxy-5-chloro-4-sulfamyl-N-butyrylaniline*

Step A.—A solution of 5 g. of 5-chloro-2-methylaniline in a mixture of 10 ml. of butyric anhydride and 10 ml. of benzene is allowed to stand at room temperature for one hour. After cooling in an ice bath, the crystalline product is collected and crystallized from benzene-hexane to give 5-chloro-2-methyl-N-butyrylaniline.

Step B.—By replacing the 5-chloro-2-methylacetanilide employed in Step A of Example 1, by an equimolecular quantity of the 5-chloro-2-methyl-N-butyrylaniline obtained as described above, and following substantially the same procedures described in Steps A and B of Example 1, there is obtained 2-carboxy-5-chloro-4-sulfamyl-N-butyrylaniline.

EXAMPLE 24

*2-carboxy-5-chloro-4-sulfamyl-N-lauroylaniline*

Step A.—5-chloro-2-methylaniline, 5 g., is dissolved in a mixture of 10 ml. of lauroyl chloride and 10 ml. of benzene and heated briefly on the steam bath. The reaction mixture then is allowed to cool to room temperature and the solid product thus formed collected on the filter. After crystallization from a mixture of benzene-hexane, 5-chloro-2-methyl-N-lauroylaniline is obtained.

Step B.—The 5-chloro-2-methyl-N-lauroylaniline is chloro-sulfonated and amidated by the process described in Example 1, Step A, and the 5-chloro-2-methyl-4-sulfamyl-N-lauroylaniline thus obtained is oxidized by the process described in Step B of Example 1 to form the corresponding 2-carboxy-5-chloro-4-sulfamyl-N-lauroylaniline.

EXAMPLE 25

*2-N-ethylcarbamyl-5-chloro-4-sulfamyl-N-lauroylaniline*

By replacing the 2-carboxy-5-chloro-4-sulfamylacetanilide employed in Example 3, by an equimolecular quantity of the 2-carboxy-5-chloro-4-sulfamyl-N-lauroylaniline obtained as described in Example 24, and following substantially the same procedure described in Example 3, there is obtained 2-N-ethylcarbamyl-5-chloro-4-sulfamyl-N-lauroylaniline.

EXAMPLE 26

*2-carboxy-5-chloro-4-sulfamyl-N-benzoylaniline*

By replacing the lauroyl chloride employed in Example 24 by an equal quantity of benzoyl chloride and following substantially the same procedures described in Example 24, Steps A and B, there is obtained 2-carboxy-5-chloro-4-sulfamyl-N-benzoylaniline.

EXAMPLE 27

*2-N-ethylcarbamyl-5-chloro-4-sulfamyl-N-benzoylaniline*

By replacing the 2-carboxy-5-chloro-4-sulfamylacetanilide employed in Example 3 by an equimolecular quantity of the 2-carboxy-5-chloro-4-sulfamyl-N-benzoylaniline obtained as described in Example 26, and following substantially the same procedure described in Example 3, there is obtained 2-N-ethylcarbamyl-5-chloro-4-sulfamyl-N-benzoylaniline.

EXAMPLE 28

*2-carbamyl-5-chloro-4-sulfamylaniline*

Step A.—A mixture of 10 g. of 2-carboxy-5-chloro-4-sulfamylaniline (obtained as described in Example 2), 75 ml. of ethyl chlorocarbonate and 75 ml. of dioxane is heated under reflux for 48–65 hours. After cooling in an ice bath, the solid is separated by filtration and recrystallized from a dimethylformamide-methanol mixture to give 4-chloro-5-sulfamylisatoic anhydride, M.P. 293° C. (dec.).

Analysis calculated for $C_8H_5ClN_2O_5S$: C, 34.73; H, 1.82; N, 10.13. Found: C, 35.10; H, 2.05; N, 10.18.

The filtrate from the reaction mixture is concentrated to dryness in vacuo and the residue crystallized from alcohol to give (2-carbethoxy-5-chloro-4-sulfamylphenyl)urethane, M.P. 219–221° C.

Analysis calculated for $C_{12}H_{15}ClN_2O_6S$: C, 41.09; H, 4.31; N, 7.99. Found: C, 41.37; H, 4.14; N, 7.95.

Step B.—4-chloro-5-sulfamylisatoic anhydride (4.5 g.) is dissolved in 25 ml. of cold 28% ammonium hydroxide and allowed to stand at room temperature for thirty minutes. The mixture then is heated on the steam bath for 30 minutes, cooled and the solid collected on the filter. Recrystallization from aqueous alcohol gives 2-carbamyl-5-chloro-4-sulfamylaniline, M.P. 277-278° C. (dec.).

Analysis calculated for $C_7H_8ClN_3O_3S$: C, 33.67; H, 3.23; N, 16.83. Found: C, 33.95; H, 3.15; N, 16.80.

The filtrate from the reaction mixture is acidified and the solid collected on the filter and recrystallized from a dimethylformamide-water mixture to give (2-carboxy-5-chloro-4-sulfamylphenyl)urea, M.P. 218° C. (dec.).

Analysis calculated for $C_8H_8ClN_3O_5S$: C, 32.72; H, 2.75; N, 14.31. Found: C, 33.05; H, 2.86, N, 14.31.

EXAMPLE 29

*5-amino-2-carboxy-4-sulfamylaniline*

A solution of 3.0 g. of 2-carboxy-5-nitro-4-sulfamylaniline, prepared as described in Example 8, in 600 ml. of a 50% alcohol-water mixture is shaken in an atmosphere of hydrogen with 400 mg. of platinum oxide catalyst until hydrogen absorption ceases. The catalyst is removed by filtration and the solution concentrated to dryness in vacuo. Crystallization of the residue from a 50% alcohol-water mixture yields 5-amino-2-carboxy-4-sulfamylaniline.

EXAMPLE 30

*2-carboxy-5-chloro-4-sulfamyl-N,N-methylpropylaniline*

Step A.—A solution of 2-carboxy-5-chloro-N-methylaniline, 0.1 mole, in 100 ml. of ethanol is heated on the steam bath with propyl iodide, 0.15 mole, for 2 hours. The solvent is removed in vacuo and the residue recrystallized from aqueous alcohol yielding 2-carboxy-5-chloro-N,N-methylpropylaniline.

Step B.—By replacing the 5-chloro-2-methylacetanilide employed in Example 1, Step A, by an equimolecular quantity of the product obtained in Step A above, and following substantially the same procedure described in Step A of Example 1, there is obtained 2-carboxy-5-chloro-4-sulfamyl-N,N-methylpropylaniline.

EXAMPLE 31

*2-carbethoxy-5-chloro-4-sulfamylacetanilide*

Dry hydrogen chloride gas is bubbled through a solution of 25 g. of 2-carboxy-5-chloro-4-sulfamylacetanilide (prepared as described in Example 1, Steps A and B) in 300 ml. of ethanol, cooled in an ice bath for 15 minutes. After heating under reflux for 5 hours, the solution is concentrated to dryness in vacuo and crystallized from aqueous alcohol to give 2-carbethoxy-5-chloro-4-sulfamylacetanilide.

EXAMPLE 32

*2-carbethoxy-5-chloro-4-sulfamyl-N-butyrylaniline*

By replacing the 2-carboxy-5-chloro-4-sulfamylacetanilide employed in Example 31, by an equimolecular quantity of the 2-carboxy-5-chloro-4-sulfamyl-N-butyrylaniline obtained as described in Example 23, and following substantially the same procedure as described in Example 31, there is obtained 2-carbethoxy-5-chloro-4-sulfamyl-N-butyrylaniline.

EXAMPLE 33

*Di-sodium salt of 2-carboxy-5-chloro-4-sulfamylaniline*

2-carboxy-5-chloro-4-sulfamylaniline, prepared as described in Example 2, is dissolved in an excess of alcoholic sodium hydroxide and the solvent then evaporated in vacuo yielding the di-sodium salt of 2-carboxy-5-chloro-4-sulfamylaniline.

The following examples described the conversion of the sulfamyl-anthranilic acids of this invention to 4-quinazolones.

EXAMPLE 34

*7-chloro-6-sulfamyl-4-quinazolone*

A mixture of 5 g. of 2-carboxy-5-chloro-4-sulfamylaniline, prepared as described in Example 2, and 5 g. of formamide is heated at 130–140° C. for 3 hours, cooled, and diluted with 25 ml. of water. The precipitate is collected and recrystallized from alcohol-water yielding 7-chloro-6-sulfamyl-4-quinazolone, M.P. 314–315° C. (dec.).

Analysis calculated for $C_8H_6ClN_3O_3S$: C, 37.00; H, 2.33; N, 16.18. Found: C, 37.26; H, 2.36; N, 16.18.

EXAMPLE 35

*7-chloro-3-ethyl-2-methyl-6-sulfamyl-4-quinazolone*

2-N-ethylcarbamyl-5-chloro-4-sulfamylacetanilide, 5 g., prepared as described in Example 3, is heated at 200–250° C. for 2 hours, cooled, and the residue crystallized from aqueous alcohol yielding 7-chloro-3-ethyl-2-methyl-6-sulfamyl-4-quinazolone.

EXAMPLE 36

*Compressed tablet comprising 0.5 g. active ingredient*

|   | G. |
|---|---|
| 2-carboxy-5-chloro-4-sulfamylaniline | 500.0 |
| Starch paste 12½%, 100 cc., allow | 12.5 |
|   | 512.5 |
| Starch U.S.P. corn | 25.0 |
| Magnesium stearate | 5.5 |
|   | 543.0 |

The 2-carboxy-5-chloro-4-sulfamylaniline is granulated with the starch paste and while moist passed through a No. 14 screen, dried at 45° C. for 20 hours an then passed 3 times through a No. 14 screen. The starch then is passed though a No. 90 bolting cloth onto the granulation and all ingredients are blended thoroughly. Then the magnesium stearate is passed through a No. 90 bolting cloth onto the granulation and these ingredients are blended after which the granulation is compressed into tablets using a 14/32″ flat, bevelled, scored punch having a thickness of 0.205±0.005″ yielding 1,000 tablets, each weighing 0.543 grams and having a hardness of 6 kgms. measured by the Monsanto Chemical Company tablet hardness tester apparatus, and a disintegration time of 5 minutes when tested on the U.S.P. tablet disintegrating apparatus (U.S. Pharmacopeia, 15th edition, page 937).

Tablets prepared as described above are suitable for oral administration at a dosage regimen individualized for each patient by his physician.

While the above examples describe the preparation of certain illustrative compounds illustrated by the structure in column 1, lines 19–25, inclusive, and a certain specific dosage form suitable for administering the novel compounds of this invention in human therapy and certain methods suitable for making the sulfamyl-anthranilic acids of this invention, it is to be understood that the invention is not to be limited by these examples or by the specific reaction conditions described for the preparation of the compounds or by the specific ingredients included in the pharmaceutical preparation described, but is understood to embrace variations and modifications falling within the scope of the appended claims.

What is claimed is:

1. A sulfamyl-anthranilic acid selected from the group consisting of compounds having the general structure

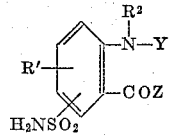

and alkali metal and alkaline earth metal salts thereof, wherein $R^1$ is selected from the group consisting of halogen, lower alkyl, lower alkoxy, nitro and amino groups; $R^2$ is selected from the group consisting of hydrogen and lower alkyl radicals; Y is selected from the group consisting of hydrogen, lower alkyl, lower alkanoyl, and benzoyl radicals; and Z is selected from the group consisiting of hydroxyl, lower alkoxy, and an amino radical.

2. A sulfamyl-anthranilic acid having the general structure

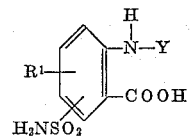

wherein $R^1$ is a halogen, and Y is a lower alkanoyl radical.

3. A sulfamyl-anthranilic acid having the general structure

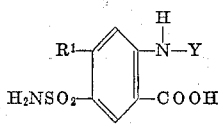

wherein $R^1$ is a halogen, and Y is a lower alkanoyl radical.

4. 2-carboxyl-5-chloro-4-sulfamylacetanilide.

5. A sulfamyl-anthranilic acid having the general formula

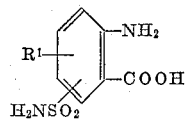

wherein $R^1$ is a halogen.

6. A sulfamyl-anthranilic acid having the general formula

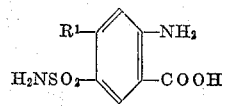

wherein $R^1$ is a halogen.

7. 2-carboxy-5-chloro-4-sulfamylaniline.

References Cited in the file of this patent

FOREIGN PATENTS 473,694     Canada _____ May 15, 1951

OTHER REFERENCES

Karrer: Organic Chemistry, pp. 490–491, Elsevier, Amsterdam (1938).

Fahlberg et al.: Berichte Deutsche Chemische Gesellschaft, vol. 20, pp. 1596–1602 (1887).